(12) United States Patent
Kim et al.

(10) Patent No.: US 9,731,687 B2
(45) Date of Patent: Aug. 15, 2017

(54) WIPER APPARATUS HAVING INTEGRALLY FORMED WASHER NOZZLE

(71) Applicants: Hyundai Motor Company, Seoul (KR); KCW CORPORATION, Daegu (KR)

(72) Inventors: Hyun Sub Kim, Seoul (KR); Nak Kyoung Kong, Seongnam-si (KR); Bock Cheol Lee, Suwon-si (KR); Jin Hee Lee, Seoul (KR); Young Sub Oh, Suwon-si (KR); Jae Hyuck An, Daegu (KR); Ji Yong Jeong, Daegu (KR); Jin Wan Park, Daegu (KR); Je Seong Lee, Daegu (KR)

(73) Assignees: Hyundai Motor Company, Seoul (KR); KB Wiper Systems Co., Ltd., Daegu (KR)

( * ) Notice: Subject to any disclaimer, the term of this patent is extended or adjusted under 35 U.S.C. 154(b) by 410 days.

(21) Appl. No.: 14/570,190

(22) Filed: Dec. 15, 2014

(65) Prior Publication Data

US 2016/0009254 A1  Jan. 14, 2016

(30) Foreign Application Priority Data

Jul. 14, 2014  (KR) .......................... 10-2014-0088235

(51) Int. Cl.
  *B60S 1/52*  (2006.01)
  *B60S 1/38*  (2006.01)
  *B60S 1/40*  (2006.01)

(52) U.S. Cl.
  CPC ............. *B60S 1/524* (2013.01); *B60S 1/3801* (2013.01); *B60S 1/4048* (2013.01); *B60S 1/3806* (2013.01)

(58) Field of Classification Search
  CPC ........ B60S 1/3801; B60S 1/524; B60S 1/381; B60S 1/3808
  USPC ........................................ 15/250.04, 250.201
  See application file for complete search history.

(56) References Cited

U.S. PATENT DOCUMENTS 8,381,348 B2    2/2013  Egner-Walter et al.
2007/0089257 A1*  4/2007  Harita ................... B60S 1/3801
                                                              15/250.04

FOREIGN PATENT DOCUMENTS

| JP | 5-5626 U | 1/1993 |
| JP | 2005-75050 A | 3/2005 |
| JP | 2007-112392 A | 5/2007 |
| JP | 2013-82437 A | 5/2013 |

(Continued)

*Primary Examiner* — Andrew A Horton
(74) *Attorney, Agent, or Firm* — Morgan Lewis & Bockius LLP

(57) ABSTRACT

A wiper apparatus having an integrally formed washer nozzle may include a retainer connected to a driving motor to be rotated, a wiper blade having a center spoiler and side spoilers, a washer module coupled to an upper surface of the center spoiler, a rubber coupled to a lower surface of the wiper blade, and a connector for detachably fastening the wiper blade and the retainer, wherein the connector may be inserted into a connector hole formed on an upper surface of the washer module and may be coupled into recesses of the center spoiler using bosses formed at an inner side thereof, and the retainer may be inserted into opposite insertion holes of the connector through a tip end thereof to be laid on an upper surface of the connector and to be caught by opposite hook coupling parts of the connector through hooks at lower portions thereof.

5 Claims, 6 Drawing Sheets

(56) References Cited

FOREIGN PATENT DOCUMENTS

| KR | 1998-040490 U | 9/1998 |
| KR | 10-2006-0116315 A | 11/2006 |
| KR | 10-2010-0023942 A | 3/2010 |
| KR | 10-0961662 B1 | 6/2010 |
| KR | 10-2010-0102877 A | 9/2010 |

* cited by examiner

WIPER APPARATUS HAVING INTEGRALLY FORMED WASHER NOZZLE

CROSS-REFERENCE TO RELATED APPLICATION

The present application claims priority to Korean Patent Application No. 10-2014-0088235 filed on Jul. 14, 2014, the entire contents of which is incorporated herein for all purposes by this reference.

BACKGROUND OF THE INVENTION

Field of the Invention

The present invention relates to a wiper apparatus having an integrally formed washer nozzle, and more particularly to an S-type wiper apparatus in which a washer module is integrally coupled to a center spoiler of a wiper blade.

Description of Related Art

In general, a wiper apparatus for a vehicle refers to an apparatus for cleanly wiping off a windshield to prevent a front field of view of a driver from being hampered due to rain or snow stuck to the windshield when it is rainy or snowy during driving of a vehicle.

The wiper apparatus is operated such that a wiper blade assembly is installed in a body part under the windshield of the vehicle and the wiper blade is pivoted leftwards and rightward on the windshield to draw a fan shape with respect to the center thereof while wiping off rain or snow.

For example, the wiper apparatus includes a wiper blade, a wiper arm, and a driving motor, a rear end of the wiper arm is connected to the driving motor through a link member, the wiper blade is attached to a tip end of the wiper arm through a connector, and the wiper blade has a wiper strip contacting the windshield of the vehicle.

Accordingly, rotation of the driving motor are converted into reciprocal pivotal movement of the wiper blade through a wiper arm, and the windshield is wiped off by the wiper strip.

In recent years, S-type wiper blades to which a spoiler is mounted have been widely used, and in the S-type wiper blade can cleanly wipe off a windshield even when a vehicle travels at a high speed because the spoiler generates a down force to press a wiper.

In addition, a type in which a washer module is integrally mounted to the wiper blade for efficient ejection of washer liquid when the windshield is washed and washer liquid is directly ejected to the windshield through the washer module in the wiper blade has been suggested.

Meanwhile, a wiper arm and a wiper blade are connected to each other in various forms, which for example, include a top lock type in which a connecting element and a coupling element are coupled to each other through snap coupling, a side pin type in which a connecting element and a coupling element are coupled to each other through insertion and rotation, and a Bayonet type in which a connecting element and a coupling element are coupled to each other through fitting.

Accordingly, the present invention suggests a coupling structure of a wiper arm (retainer) and a washer module in an S-type wiper blade to which a washer nozzle is integrally mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wiper apparatus having an integrally formed washer nozzle in which a wiper blade can be very easily attached and detached and a firm fastening state of the wiper blade can be secured through a upward, downward, forward, and rearward regulation of the wiper apparatus by realizing a new connection structure in which the retainer is slidably coupled to the wiper blade using a connector when the wiper blade is coupled to the retainer.

The wiper apparatus having an integrally formed washer nozzle according to the present invention may have the following features.

In accordance with an aspect of the present invention, there is provided a wiper apparatus having an integrally formed washer nozzle, the wiper apparatus including a retainer connected to a driving motor to be rotated, a wiper blade having a center spoiler and side spoilers, a washer module coupled to an upper surface of the center spoiler, a rubber coupled to a lower surface of the wiper blade, and a connector for detachably fastening the wiper blade and the retainer, wherein the connector is inserted into a connector hole formed on an upper surface of the washer module and is coupled into recesses of the center spoiler using bosses formed at an inner side thereof, and the retainer is inserted into opposite insertion holes of the connector through a tip end thereof to be laid on an upper surface of the connector and to be caught by opposite hook coupling parts of the connector through hooks at lower portions thereof.

A positioning boss may be formed in the connector and a positioning hole through which the positioning boss is inserted is formed at a tip end of the retainer.

The hooks of the retainer and the hook coupling parts of the connector may be caught by each other while contacting each other through inclined surfaces thereof.

A tip end of the connector and a tip end of the retainer may have extensions inserted into and positioned in an inside of the washer module.

The retainer may be disposed along an upper portion of the wiper blade in parallel to prevent a washer connecting connector provided in the washer module from being exposed to the outside while covering the washer connecting connector.

The wiper apparatus having an integrally formed washer nozzle according to the present invention may have the following advantages.

First, because a retainer and a connector are slidably assembled, a wiper blade can be very easily attached and detached. Accordingly, the wiper blade can be exchanged very conveniently.

Second, an operation of a wiper can be improved. For example, a firm fastening state of the wiper blade can be secured through an upward, downward, leftward, and rightward regulation of the retainer and the connector and an upward and downward regulation of the connector.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
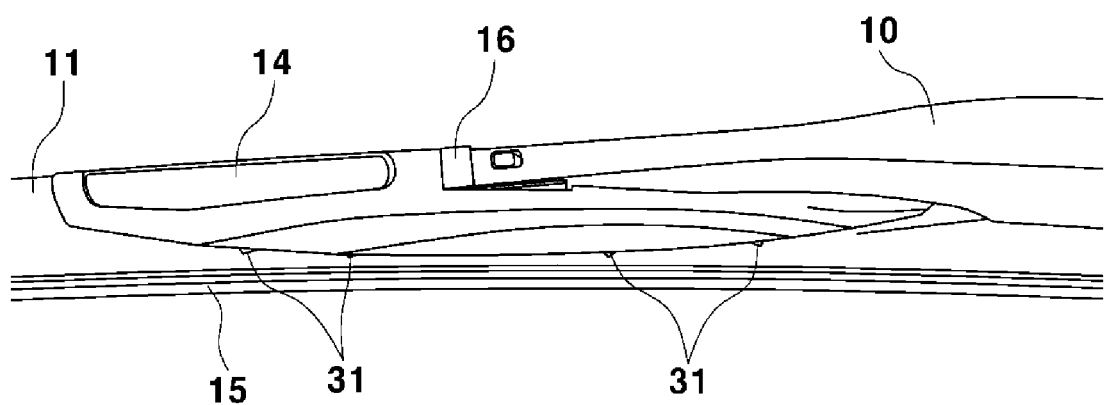
FIG. 1 is a partially enlarged perspective view showing a wiper apparatus according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

Figure 2:
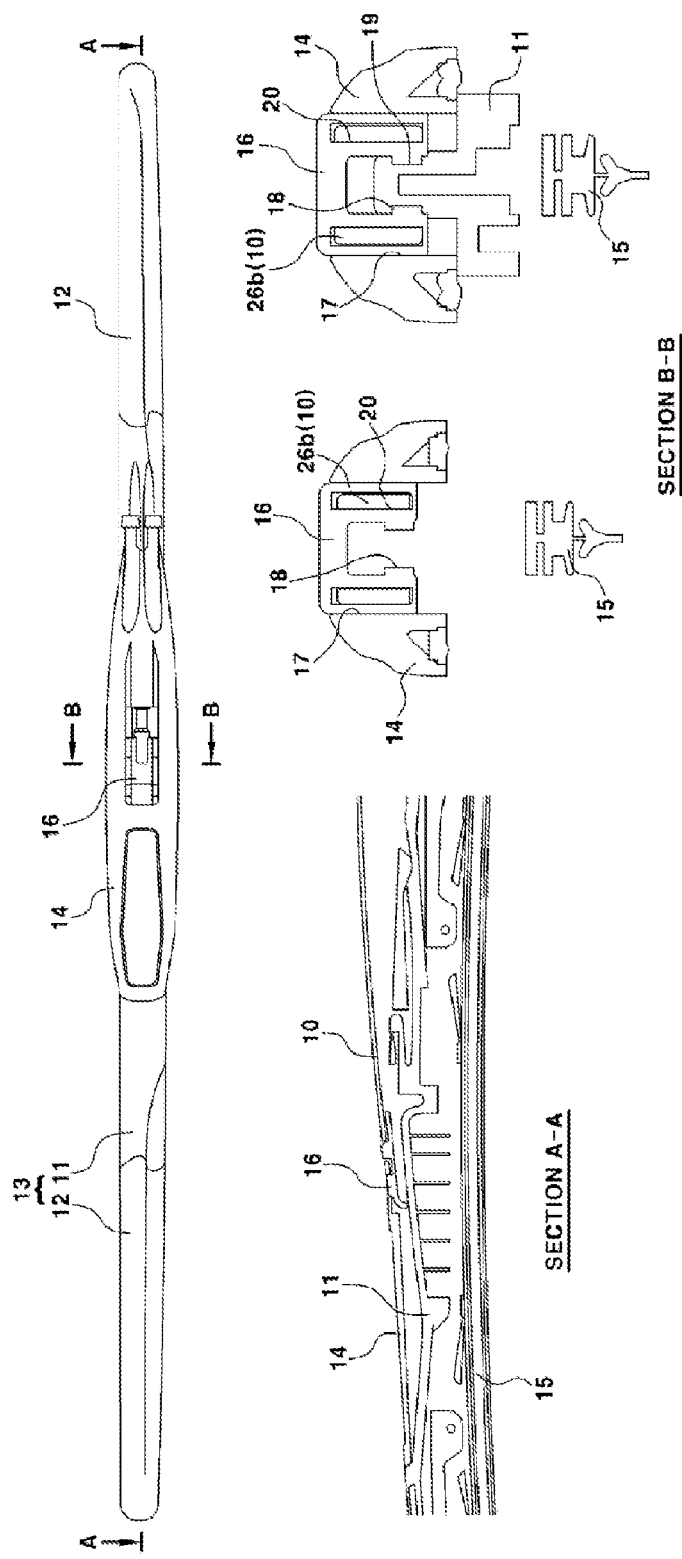
FIG. 2 shows a plan view and a sectional view showing a wiper apparatus according to the exemplary embodiment of the present invention.

FIG. 1 is a partially enlarged perspective view showing a wiper apparatus according to an exemplary embodiment of the present invention. FIG. 2 shows a plan view and a sectional view showing a wiper apparatus according to the exemplary embodiment of the present invention.

As shown in FIGS. 1 and 2, a wiper apparatus of the present invention is an S-type wiper apparatus to which a washer module is integrally coupled, and a wiper blade may be very easily attached and detached by adopting a new form of a connector for fastening a retainer to the wiper blade. Further, the wiper blade can be firmly fastened.

To this end, the wiper apparatus includes a retainer 10 connected to a driving motor to be rotated, and the retainer 10 is detachably coupled to a washer module 14 by the medium of a connector 16 through a tip end thereof.

A substantially tetragonal connector hole 17 is formed on an upper surface of the washer module 14, the connector 16 is inserted into and positioned in the connector hole 17, and the retainer 10 is slidably inserted into and fastened to the positioned connector 16, so that the retainer 10 may be fastened to the washer module 14, that is, the wiper blade 13 to which the washer module 14 is coupled.

That is, a tip end of the retainer 10 is attached to and laid on an upper surface of the connector 16 while being into the opposite insertion holes 20 of the connector 16, and the opposite hooks (21 of FIG. 3) at lower portions of the tip end of the retainer 10 are caught by the opposite coupling parts (22 of FIG. 4) of the connector 16.

The wiper apparatus includes a wiper blade 13 including a center spoiler at an intermediate lengthwise portion thereof, and side spoilers 12 on opposite sides, and a rubber 15 for wiping off a windshield is coupled to a lower surface of the wiper blade 13.

Here, like a rubber of a general wiper apparatus, the rubber 15 may be coupled to a wiper blade through a known structure.

The wiper apparatus also includes a washer module 14 for directly ejecting washer liquid to the windshield, and the washer module 14 is coupled to an upper surface of an intermediate lengthwise portion of the wiper blade 13, that is, an upper surface of the center spoiler 11.

The washer module 14 includes a washer connecting connector (27 of FIG. 6) to which a hose is connected to supply washer liquid, and a plurality of washer liquid ejection holes 31 are formed in a washer liquid passage and a lower end of the module.

Accordingly, the washer module 14 may directly eject washer liquid to the windshield through the washer liquid ejection holes 31 while moving together with the wiper blade 13.

Here, the washer module 14 may be coupled to an upper surface of the wiper blade 13, that is, an upper surface of the center spoiler 11 through a slidable insertion structure using a recess and a boss, and the coupling structure of the washer module may be adopted without any limitation as long as it is generally known in the field to which the present invention pertains.

The wiper apparatus includes a connector 16 for detachably fastening the wiper blade 13 and the retainer 10.

The connector 16 is inserted into a connector hole 17 formed on an upper surface of the washer module 14, and is coupled to recesses 19 formed on opposite surfaces of an upper end of the spoiler 11 using two bosses 18 formed on opposite sides of an inside thereof.

The connector 16 coupled through the opposite bosses 18 may rotate the bosses 18 about a rotation center axis through an operation of leaning the retainer upwards and downwards.

Figure 3:
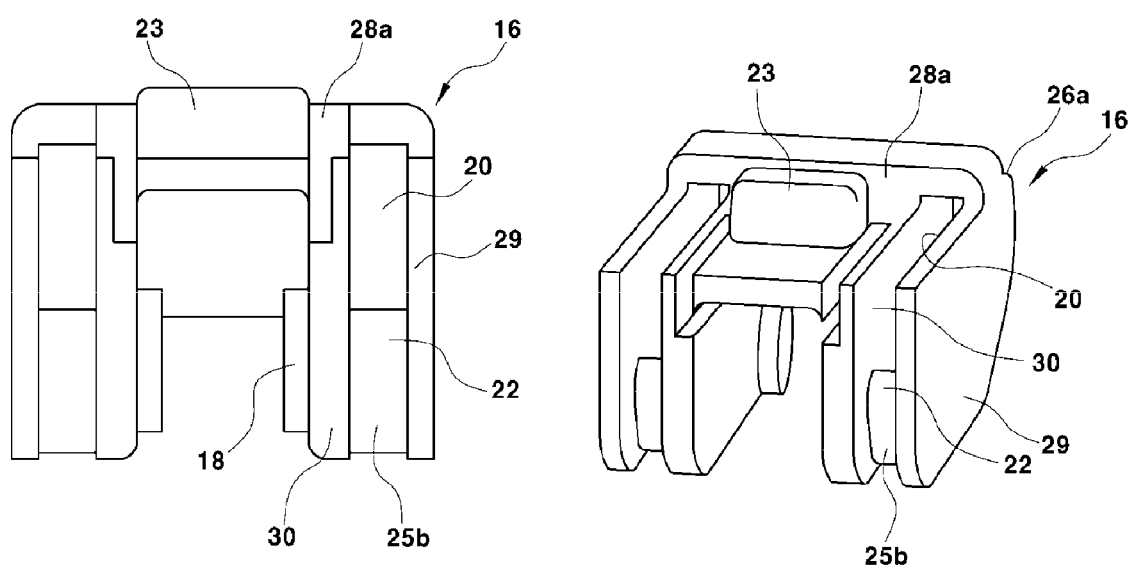
FIG. 3 is a perspective view showing a connector of the wiper apparatus according to the exemplary embodiment of the present invention.

FIG. 3 is a perspective view showing a connector of the wiper apparatus according to the exemplary embodiment of the present invention.

As shown in FIG. 3, the connector 10 is a unit for catching the retainer 10 while being rotatably coupled to the center spoiler 11, and integrally includes an upper plate, opposite outer walls 29, and inner side walls 30 disposed in parallel to the outer side walls 29 to be spaced apart from the outer side walls 29.

Insertion holes 20 which are opened in forward and rearward directions and formed between the outer walls 29 and the inner walls 30 are formed at opposite sides of the connector 10, and tip ends of the retainer 10, that is, extensions 26b of the retainer 10 are inserted into the insertion holes 20 in the lengthwise direction of the retainer 10.

Circular bosses 18 facing each other are provided on the insides of the connector 10, that is, the inner wall surfaces of the inner walls 30, and the bosses 18 are coupled to the recesses 19 of the center spoiler 12 to function as a rotation center axis of the connector and a connector support.

A substantially tetragonal positioning bosses 23 protrudes from an upper plate of the connector 16, and the boss 23 may be inserted into a positioning hole 24 formed in an upper plate of a tip end of the retainer 20.

Accordingly, the position of the retainer 20 may be regulated while the movement of the retainer 20 is limited in a forward/rearward direction (lengthwise direction) and a leftward/rightward direction (widthwise direction) thereof by a fastening structure of the positioning boss 23 and the positioning hole 24.

A latching step 28a is formed on a front side of the upper plate of the connector 16, and the latching step 28a is latched by a latching step 28b formed on an upper surface of the tip end of the retainer 10.

Accordingly, if the retainer 10 is leaned downwards at a time point when the latching steps 28a and 28b are latched by each other when the extensions 26a of the retainer 10 are inserted into the insertion holes 20 of the connector 16, the positioning boss 23 of the connector 16 is inserted into the positioning hole 24 of the retainer 10 and the hooks 21 of the retainer 10 is caught by the hook coupling parts 22 of the connector 16.

The connector 16 includes hook coupling parts 22 by which the hooks 21 of the retainer 10 may be caught, and the hook coupling parts 22 are formed between the inner side walls 30 and the outer side walls 29 at a rear end of the connector 16.

In particular, the hook coupling parts 22 has inclined surfaces 25b which gradually face downwards as they go from a rear end of the connector toward a tip end of the connector 16, and accordingly, the hooks 21 formed in the retainer 10 may be caught by the hook coupling parts 22 while being rotating downward, and the hooks 21 also have inclined surfaces 25a which gradually face downward as they go toward the tip end of the retainer 10, so that the inclined surfaces 25a of the hooks 21 may be caught by the inclined surfaces 25b of the hook coupling parts 22 while contacting each other.

Figure 4:
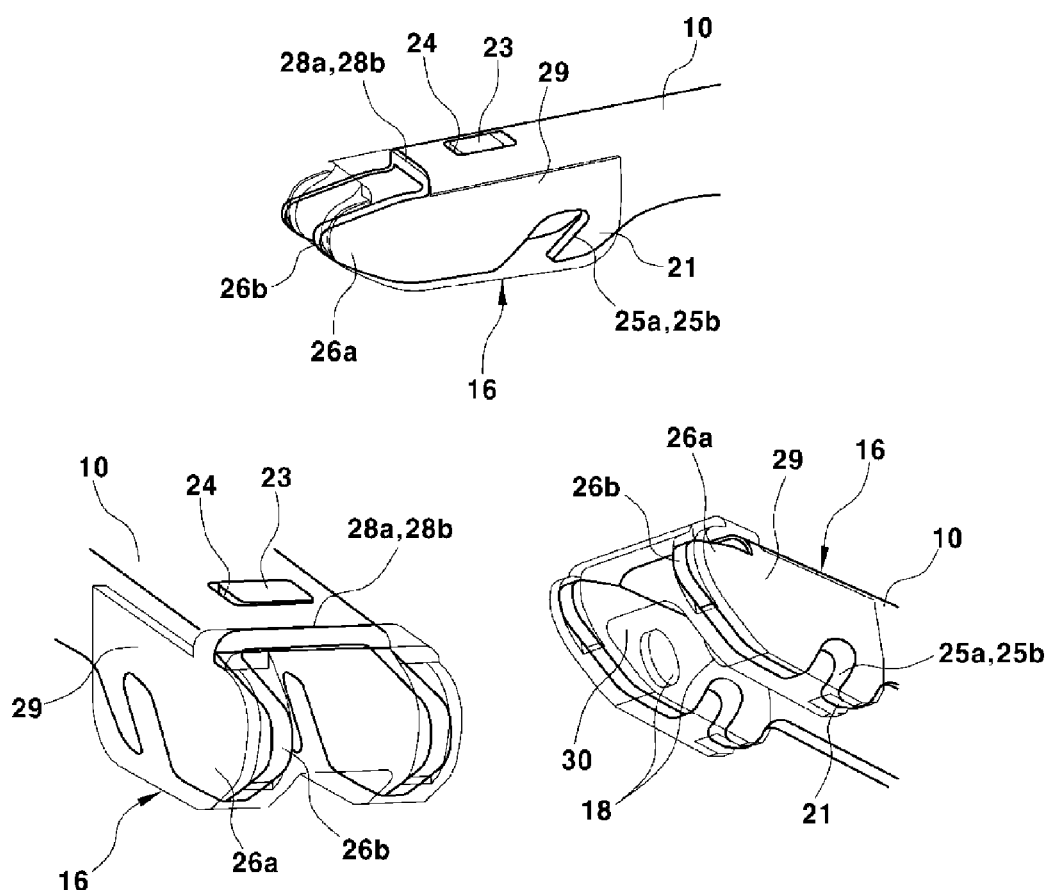
FIG. 4 is a perspective view showing a coupling structure of a retainer and the connector of the wiper apparatus according to the exemplary embodiment of the present invention.
Figure 5:
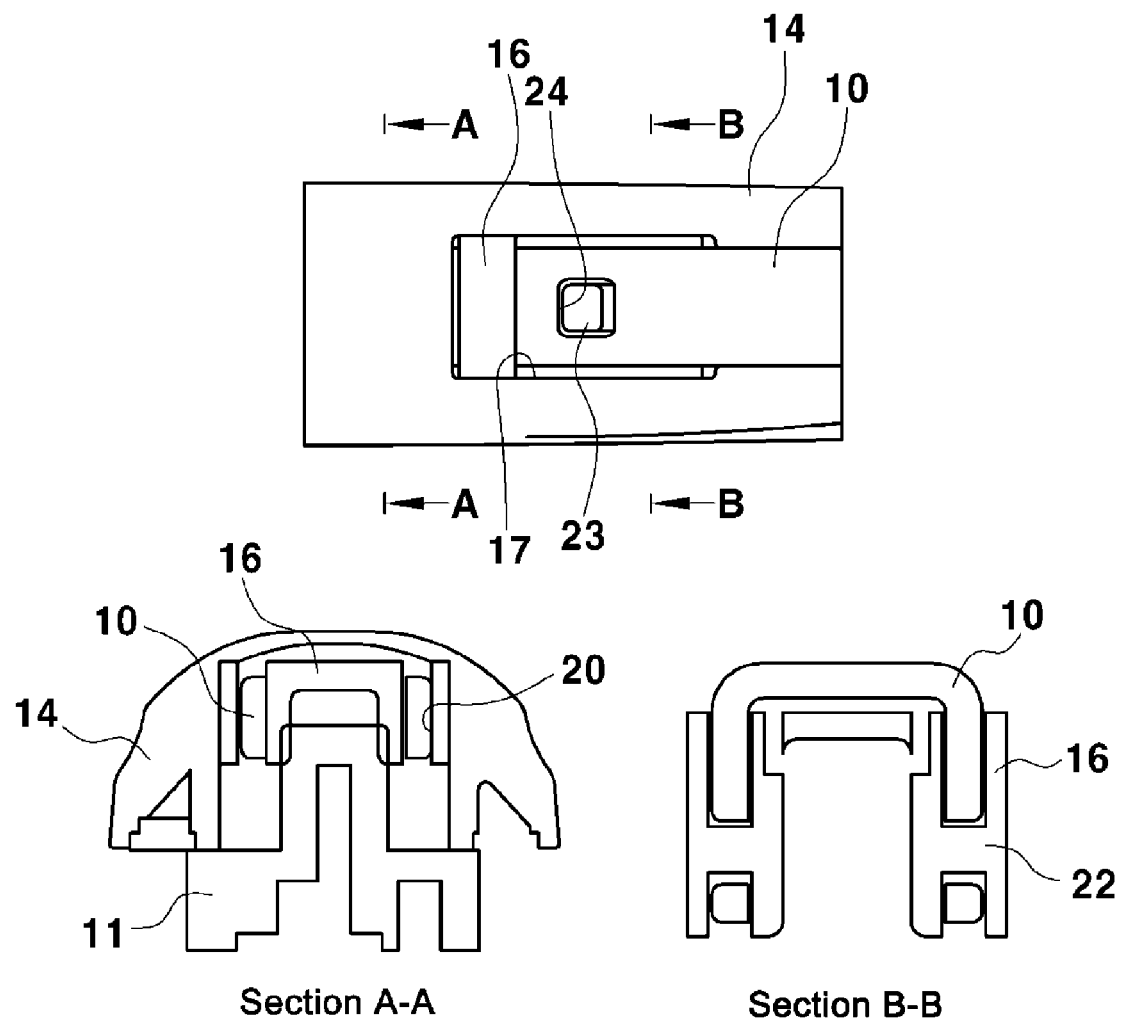
FIG. 5 shows a plan view and a sectional view showing the coupling structure of the retainer and the connector of the wiper apparatus according to the exemplary embodiment of the present invention.

FIG. 4 is a perspective view showing a coupling structure of a retainer and the connector of the wiper apparatus according to the exemplary embodiment of the present invention. FIG. 5 shows a plan view and a sectional view showing the coupling structure of the retainer and the connector of the wiper apparatus according to the exemplary embodiment of the present invention.

As shown in FIGS. 4 and 5, the coupling structure of the retainer 10 and the connector 16 will be described in detail.

The extensions 26b formed at a tip end of the retainer 10 are inserted into the insertion holes 20 of the connector 16 from a rear end side of the connector 16.

Then, the retainer 10 proceeds while maintaining a posture erected upwards further as compared with the connector 16.

After proceeding until the latching steps 28b of the tip end of the retainer 10 is blocked by the latching steps 28a in the connector 16, the retainer 10 is leaned downwards about the extensions 26b.

The hooks 21 of the retainer 10 which go downwards as if they were rotated are fastened to the bottom surfaces of the hook coupling parts 22 in the connector 16 and the hooks 21 of the retainer 10 and the hook coupling parts 22 of the connector 16 are caught by each other while the inclined surfaces 25a and 25b contact each other.

At the same time, the positioning holes 24 of the retainer 10 and the positioning bosses 23 of the connector 16 may be fitted with each other to be caught by each other.

The extensions 26a formed at a tip end of the connector 16 and the extensions 26b formed at a tip end of the retainer 10 and located in the insertion holes 20 of the connector 16 may be inserted into and positioned in an inside of the washer module 14 covering the extensions 26a and 26b.

Figure 6:
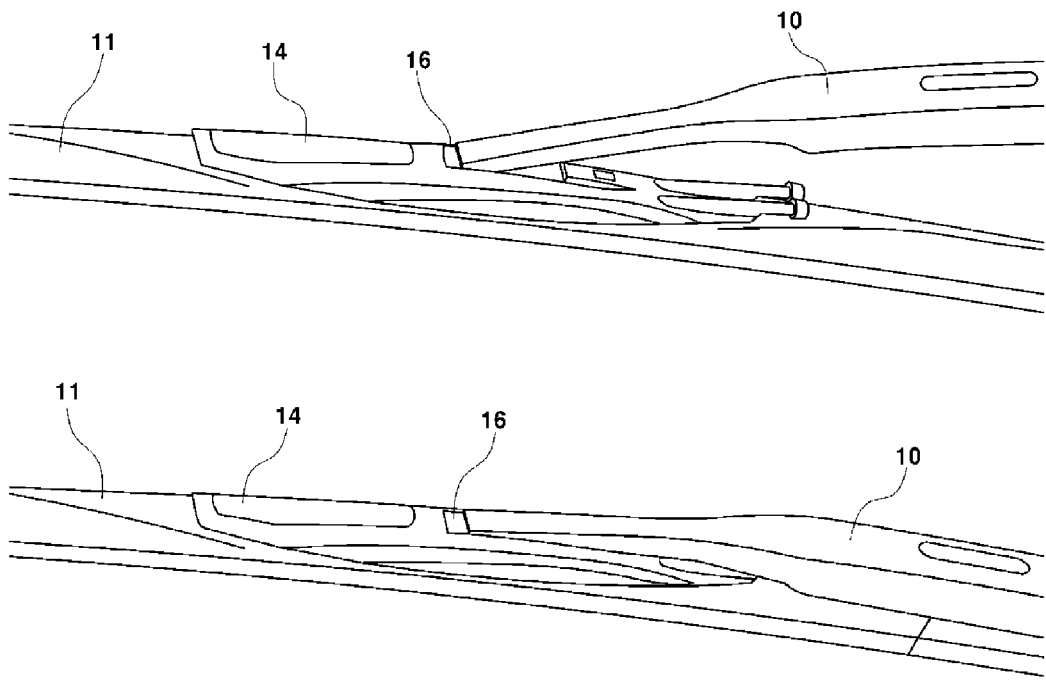
FIG. 6 is a perspective view showing a state in which a wiper blade is mounted to the retainer in the wiper apparatus according to the exemplary embodiment of the present invention.

FIG. 6 is a perspective view showing a state in which a wiper blade is mounted to the retainer in the wiper apparatus according to the exemplary embodiment of the present invention.

As shown in FIG. 6, the entire wiper blade 13 to which the washer module 14 is integrally coupled is mounted to the retainer 10.

While a rear end of the connector 16 coupled to the washer module 14 maintains an inclined posture in which a rear end of the connector 16 faces upwards and the retainer 10 is inclined in parallel to the connector 16, the extensions of the tip end of the retainer 10 are slidably pushed and inserted into the insertion holes of the connector 16.

Subsequently, if the retainer erected inclinedly is leaned downwards to be lowered, the tip end of the retainer 10 and the connector 16 also are rotated about the bosses 18 to be leaned downwards.

Next, if the retainer 10 covers an upper surface of the wiper blade 13, the hooks of the retainer 10 are caught by the hook coupling parts 22 of the connector 16 and thus the entire wiper blade 13 is mounted to the retainer 10.

Here, the retainer 10 covers the wiper blade 13 along the upper side of the wiper blade 13, and the washer connecting connector 27 in the washer module 14 is not exposed to the outside while being covered by the retainer 10.

Of course, the catching of the hooks and the hook coupling parts and the catching of the positioning bosses and the positioning holes are released by leaning the retainer 10 upwards when the wiper blade 13 is separated, and in this state, if the wiper blade 13 is pulled in a lengthwise direction thereof, the wiper blade 13 can be easily separated from the retainer 10.

In this way, in the S-type wiper apparatus to which a washer module is integrally coupled according to an exemplary embodiment of the present invention, a wiper blade can be very easily attached and detached and a fastening state of the wiper blade can be firmly maintained by realizing a new connection method in which a retainer is slidably pushed into a connector and is leaned downwards when the wiper blade is coupled to the retainer.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper apparatus having an integrally formed washer nozzle, the wiper apparatus comprising:
    a retainer connected to a driving motor to be rotated;
    a wiper blade having a center spoiler and side spoilers;
    a washer module coupled to an upper surface of the center spoiler;
    a rubber coupled to a lower surface of the wiper blade; and
    a connector for detachably fastening the wiper blade and the retainer,
    wherein the connector is inserted into a connector hole formed on an upper surface of the washer module and is coupled into recesses of the center spoiler using bosses formed at an inner side of the connector, and the retainer is inserted into opposite insertion holes of the connector, the insertion holes are formed at a tip end of the connector, the retainer to be laid on an upper surface of the connector and to be caught by opposite hook coupling parts of the connector through hooks of the retainer, and the hooks are formed at lower portions of the retainer.

2. The wiper apparatus of claim 1, wherein a positioning boss is formed in the connector and a positioning hole through which the positioning boss is inserted is formed at a tip end of the retainer.

3. The wiper apparatus of claim 1, wherein the hooks of the retainer and the hook coupling parts of the connector are caught by each other while contacting each other through inclined surfaces of the connector.

4. The wiper apparatus of claim 1, wherein the tip end of the connector and a tip end of the retainer have extensions inserted into and positioned in an inside of the washer module.

5. The wiper apparatus of claim 1, wherein the retainer is disposed along an upper portion of the wiper blade to prevent a washer connecting connector provided in the washer module from being exposed to the outside while being covered by the retainer.

* * * * *